United States Patent [19]
Cretsinger

[11] Patent Number: 5,461,969
[45] Date of Patent: Oct. 31, 1995

[54] LEMON SLICE SQUEEZER

[76] Inventor: Daniel D. Cretsinger, P.O. Box 244, Coon Rapids, Iowa 50058

[21] Appl. No.: 340,715

[22] Filed: Nov. 16, 1994

[51] Int. Cl.[6] .............................. A23N 1/00; A47J 19/02; A47J 43/00
[52] U.S. Cl. .............. 99/506; 99/495; 100/133; 100/135; 100/213; 100/234; D7/666
[58] Field of Search .................. 99/495, 496, 506–508, 99/509, 513; 100/110, 116, 131, 133, 135, 213, 234; D7/665, 666, 674

[56] References Cited

U.S. PATENT DOCUMENTS

| 26,879 | 1/1860 | Bixler | 100/234 |
| D. 273,551 | 4/1984 | Kirby | D7/666 |
| D. 299,803 | 2/1989 | Chow | D7/48 |
| 895,446 | 8/1908 | Forssman | 100/133 |
| 995,286 | 6/1911 | Pender | 100/234 |
| 2,733,746 | 2/1956 | Rauner | 99/508 |
| 3,126,821 | 3/1964 | Schlidt et al. | 100/133 |
| 3,207,610 | 9/1965 | Belkin | 99/171 |
| 3,264,975 | 8/1966 | Williams | 99/508 |
| 3,327,621 | 6/1967 | Zysset | 99/508 |
| 3,515,057 | 6/1970 | Aldridge | 100/126 |
| 3,630,141 | 12/1971 | Elshazly | 100/234 |
| 3,636,870 | 1/1972 | Arthur | 100/211 |
| 3,754,502 | 8/1973 | Kaufman | 100/133 |
| 4,530,277 | 7/1985 | Matsumoto | 99/506 |
| 4,531,457 | 7/1985 | Sivaslian | 99/507 |
| 5,101,720 | 4/1992 | Bianchi | 99/506 |

FOREIGN PATENT DOCUMENTS

| 3604649 | 10/1987 | Germany | 99/513 |
| 8800568 | 10/1989 | Netherlands | 99/513 |

Primary Examiner—Timothy F. Simone
Attorney, Agent, or Firm—Zarley, McKee, Thomte, Voorhees & Sease; Dennis L. Thomte

[57] ABSTRACT

A lemon slice squeezer comprising a body portion supported upon a pedestal which may be placed on a table or the like. The body portion includes an open upper end which is adapted to receive a semi-circular lemon slice therein. An elongated and arcuate lemon squeezing handle having one end is pivotally secured to the body portion at the forward end and is adapted to be moved downwardly into the body portion to squeeze the lemon slice therein. The body portion may then be tipped to pour the lemon juice therefrom.

6 Claims, 3 Drawing Sheets

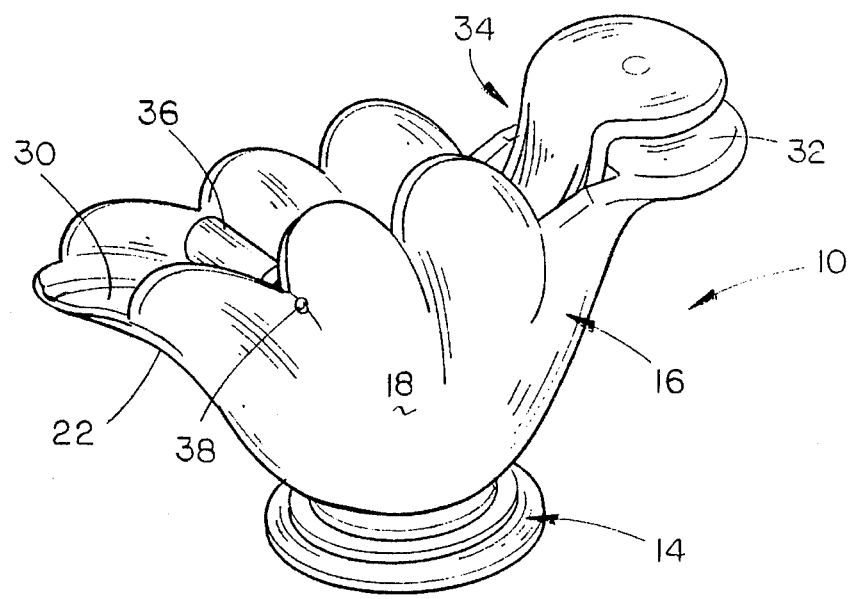
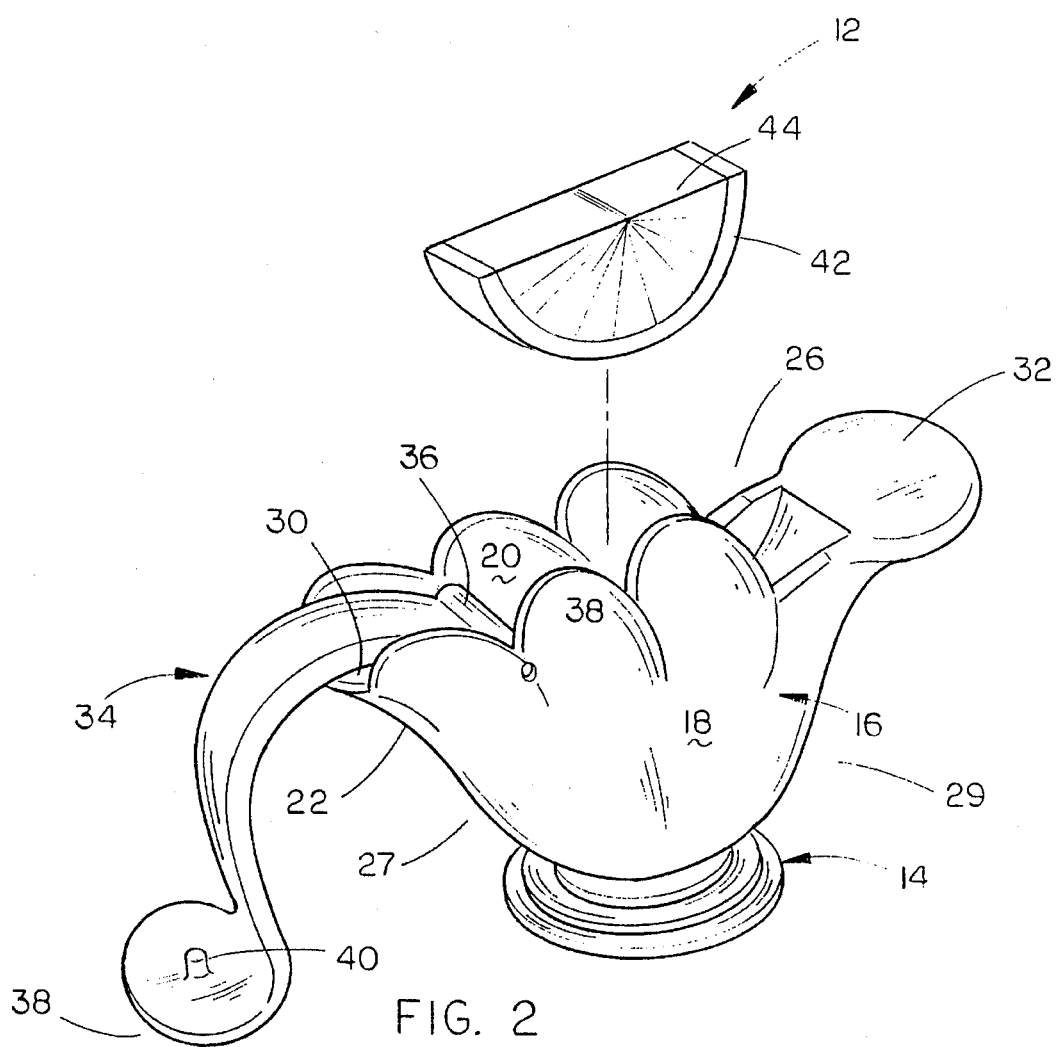

LEMON SLICE SQUEEZER

BACKGROUND OF THE INVENTION

1. Field of the Invention

This invention relates to a lemon squeezer and more particularly to a lemon slice squeezer which facilitates the extraction of juice from a lemon slice without the juice objectionably squirting from the lemon slice.

2. Description of the Related Art

Lemons, or portions thereof, are frequently squeezed to enable the juice thereof to be applied to food such as fish or the like or squeezed so that the juice thereof may be placed in a glass of iced tea or the like. Frequently, during the squeezing operation, the lemon juice squirts onto the area surrounding the squeezing operation as well as the person squeezing the lemon. Further, the lemon juice frequently squirts on other persons close to the person actually squeezing the lemon.

Many types of lemon squeezers have been previously provided, but they are not easy to use, are not aesthetically pleasing, and do not completely eliminate the squirting problem.

It is therefore a principal object of the invention to provide an improved lemon slice squeezer.

A further object of the invention is to provide a lemon slice squeezer which has an aesthetic appearance.

Still another object of the invention is to provide a lemon slice squeezer which facilitates the juice being extracted from the lemon slice without the juice being squirted from the squeezer.

Still another object of the invention is to provide a lemon slice squeezer which facilitates the squeezing of the lemon slice without the necessity of the person using the squeezer coming into contact with the lemon slice during the actual squeezing operation.

Still another object of the invention is to provide a lemon slice squeezer which is convenient to use.

Still another object of the invention is to provide a lemon slice squeezer which is economical of manufacture and durable in use.

These and other objects will be apparent to those skilled in the art.

SUMMARY OF THE INVENTION

A lemon slice squeezer is provided which includes a body portion supported upon a pedestal which may rest upon a table or the like. The body portion includes horizontally spaced-apart side walls which are substantially vertically disposed and which have front and back walls extending therebetween. The body portion defines an open upper end, a forward pouring lip portion, and a back portion. An elongated, arcuate squeezing handle or lever is pivotally mounted on the body portion and is movable from an open first position to a closed second position. When it is desired to squeeze the juice from a lemon slice, the squeezing handle is pivotally moved to its open position so that a semi-circular lemon slice may be placed in the body portion. The squeezing handle is then pivotally moved to its closed position which causes the lemon juice to be squeezed from the lemon slice. The squeezer may then be grasped by a person and tipped so that the lemon juice pours from the pouring lip at the forward end of the body portion. The relationship of the squeezing handle with respect to the body portion is such that juice will not squirt therefrom during the squeezing operation.

BRIEF DESCRIPTION OF THE DRAWINGS

FIG. 1 is a perspective view of the lemon slice squeezer of this invention;

FIG. 2 is a perspective view of the lemon slice squeezer of this invention with the squeezing handle being in the open position and the lemon slice about to be positioned in the body portion of the lemon slice squeezer;

DESCRIPTION OF THE PREFERRED EMBODIMENT

Figure 3:
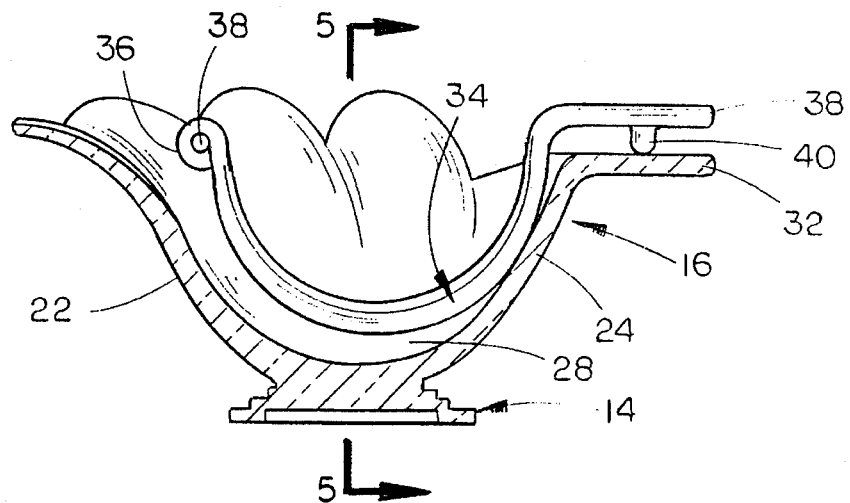
FIG. 3 is a longitudinal sectional view of the lemon slice squeezer of this invention.

The lemon slice squeezer of this invention is referred to generally by the reference numeral 10 which is adapted to squeeze the juice from a semi-circular lemon slice 12 and to enable the juice to be poured therefrom onto food or into a glass of iced tea or the like.

Squeezer 10 includes a base or pedestal 14 adapted to rest upon a table or the like. For purposes of description, the body portion 16 will be described as including a forward end 27 and a rearward end 29. Body portion 16 is preferably integrally formed with pedestal 14 and includes a pair of horizontally spaced-apart and substantially vertically disposed side walls 18 and 20. Front wall 22 extends between side walls 18 and 20 as does back wall 24. The upper ends of walls 18, 20, 22 and 24 define an open upper end generally referred to by the reference numeral 26. The walls 18, 20, 22 and 24 also define a lemon receiving compartment 28 which is adapted to receive the semi-circular lemon slice 12 therein. The upper forward ends of side walls 18 and 20 and the upper end of front wall 22 define a juice pour or pouring lip 30. The numeral 32 refers to a gripping handle which is provided at the upper rearward ends of side walls 18 and 20 and the upper rearward end of back wall 24.

An elongated, arcuate squeezing lever or handle 34 including ends 36 and 38 is pivotally secured to the body portion 16 so that handle 34 may be selectively pivotally moved from the open first position illustrated in FIG. 2 to the closed second position illustrated in FIG. 1. End 36 of handle 34 is received between the side walls 18 and 20 rearwardly of the forward end of body portion 16 as best seen in FIG. 3 and is pivotally secured to walls 18 and 20 by means of pin 38. As best seen in FIG. 3, handle 34 is arcuately formed so that it has the same arcuate shape as the lower end of compartment 28. As also best seen in FIG. 3, end 38 of handle 34 is preferably provided with a stop 40 which is adapted to engage the upper surface of handle 32 to limit the pivotal movement of handle 34 with respect to body portion 16. Preferably, the squeezer 10 of this invention is formed of a clear plastic material suitable for dishwasher cleaning. However, the squeezer 10 could be formed of a glass material if so desired. It is also preferred that the upper ends of the walls 18 and 20 be scalloped, as illustrated, to provide an aesthetic appearance.

Figure 4:
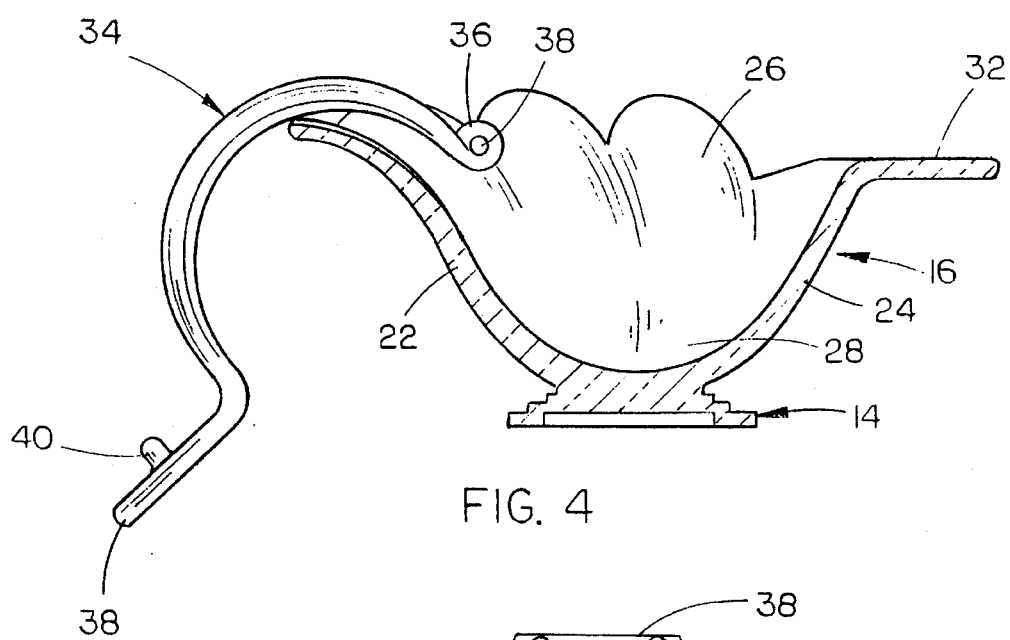
FIG. 4 is a view similar to FIG. 3 except that the squeezing handle has been moved to its open position.
Figure 5:
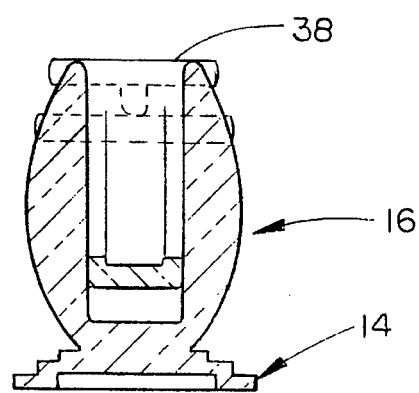
FIG. 5 is a sectional view seen on lines 5—5 of FIG. 3.

In use, when it is desired to pour lemon juice onto food such as fish or the like or when it is desired to pour lemon juice into iced tea or the like, handle 34 is first moved to the position illustrated in FIGS. 2 and 4. The lemon slice 12 is then inserted into the compartment 28 as illustrated in FIG. 2 with the rind 42 being positioned below the pulp 44 of the slice 12. When positioned in compartment 28, rind 42 will normally rest upon the arcuate lower end of the compartment 28. Handle 34 is then pivotally moved from the open position of FIGS. 2 and 4 to the closed position of FIGS. 1, 3, 5 and 6. Movement of the handle 34 to its closed position squeezes the juice from the lemon slice with the juice remaining in the lower portion of compartment 28. As stated, stop 40 limits the movement of handle 34 with respect to body portion 16. The width of handle 34 is such that it is substantially equal to the distance between the inner surfaces of walls 18 and 20 so that the juice cannot squirt from the compartment 28 as the lemon slice is being squeezed.

Figure 6:
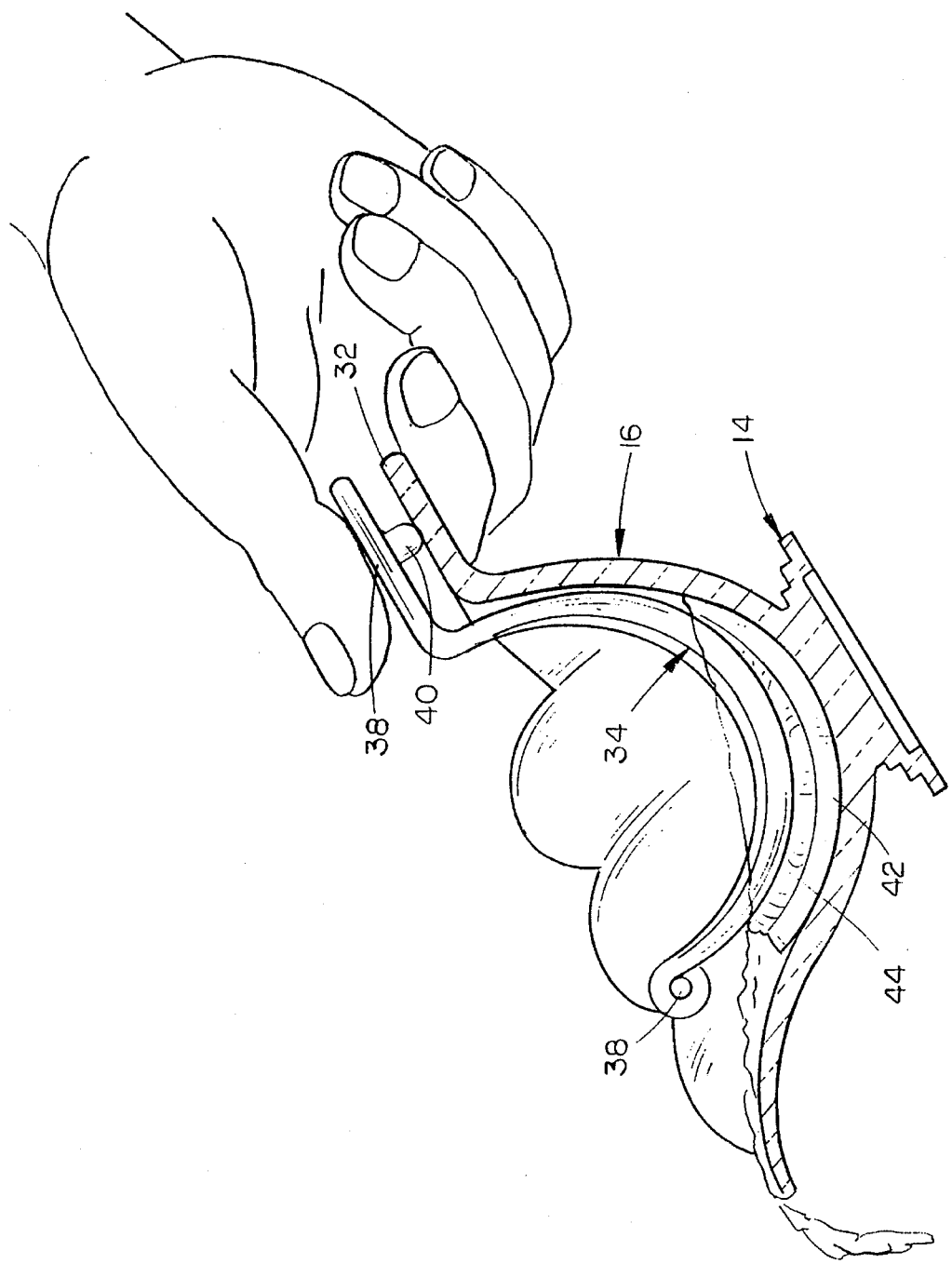
FIG. 6 is a sectional view illustrating the lemon slice squeezer being tipped so that the lemon juice from the lemon slice will pour therefrom.

When the lemon slice 12 has been squeezed by the movement of handle 34 to its closed position, the juice in the lower end of compartment 28 beneath handle 34 may be poured from the squeezer as illustrated in FIG. 6. The squeezing operation is accomplished without fear that lemon juice will be squirted onto the person or persons in the vicinity of the squeezer. Thus it can be seen that the invention accomplishes at least all of its stated objectives.

I claim:

1. A lemon squeezer apparatus comprising:

a base portion adapted to be positioned on a horizontal supporting surface such as a table;

a body portion on said base portion and including a pair of horizontally spaced-apart and vertically disposed side walls, said side walls having forward and rearward ends, a front wall extending between the forward ends of said side walls; a back wall extending between the rearward ends of said side walls; said body portion having an open upper end; said side walls and said front and back walls defining an open upper-ended lemon slice receiving compartment having an arcuate lower end which has a configuration generally corresponding to the exterior shape of a semi-circular lemon slice; the upper forward ends of said side walls and said front defining a juice pouring lip;

an elongated and arcuate lemon squeezing handle having forward ends and rearward ends;

said handle having its forward end positioned between said side walls rearwardly of the forward ends thereof and being pivotally secured thereto;

said handle being selectively pivotally movable with respect to said body portion from a first position to a second position;

said handle, when in its said first position, being positioned to permit the lemon slice to be positioned in said slice receiving compartment;

said handle, when moved from its said first position to its said second position, engaging and squeezing the lemon slice in said compartment to squeeze the juice therefrom which remains in the lower portion of said compartment until said body portion is tipped forwardly to permit the lemon juice to flow from said compartment over said juice pouring lip.

2. The apparatus of claim 1 wherein said handle has a width substantially equal to the distance between said side walls.

3. The apparatus of claim 1 wherein a stop is provided on the rearward end of said handle for engagement with said body portion for limiting the movement of said handle with respect to said body portion.

4. The apparatus of claim 1 wherein said body portion and said base portion are integrally formed.

5. The apparatus of claim 1 wherein said body portion, said base portion, and said handle are comprised of a plastic material.

6. The apparatus of claim 1 wherein said body portion, said base portion, and said handle are comprised of a glass material.

\* \* \* \* \*